(12) United States Patent
Boeke et al.

(10) Patent No.: US 9,982,560 B2
(45) Date of Patent: May 29, 2018

(54) COOLING FEED ORIFICES

(71) Applicant: United Technologies Corporation, Hartford, CT (US)

(72) Inventors: Mark A. Boeke, Plainville, CT (US); Kristopher K. Anderson, Manchester, CT (US); Jeffrey J. De Gray, Hampden, CT (US); Jeffrey R. Levine, Vernon Rockville, CT (US); Sarah Riley, Glastonbury, CT (US); Richard M. Salzillo, Jr., Plantsville, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 366 days.

(21) Appl. No.: 14/599,075

(22) Filed: Jan. 16, 2015

(65) Prior Publication Data

US 2016/0208627 A1    Jul. 21, 2016

(51) Int. Cl.
*F01D 25/12* (2006.01)
*F01D 9/06* (2006.01)
(Continued)

(52) U.S. Cl.
CPC ............. *F01D 25/12* (2013.01); *F01D 9/023* (2013.01); *F01D 9/04* (2013.01); *F01D 9/06* (2013.01);
(Continued)

(58) Field of Classification Search
CPC . F01D 9/023; F01D 9/04; F01D 25/12; F01D 5/081; F01D 9/06; F01D 9/065;
(Continued)

(56) References Cited

U.S. PATENT DOCUMENTS

| 6,227,798 | B1 | 5/2001 | Demers et al. |
| 7,246,993 | B2 * | 7/2007 | Bolms ..................... F01D 25/12 |
| | | | 415/116 |

(Continued)

FOREIGN PATENT DOCUMENTS

WO    2014052538 A1    4/2014

OTHER PUBLICATIONS

How to Drill at an Angle, Lee Wallender, Jul. 12, 2014, retrieved from the Internet on Feb. 2, 2017, URL:<https://web.archive.org/web/20140712142555/http://homerenovations.about.com/od/legalsafetyissues/ss/How-To-Drill-At-An-Angle.htm>.*

(Continued)

*Primary Examiner* — Woody Lee, Jr.
*Assistant Examiner* — Sang K Kim
(74) *Attorney, Agent, or Firm* — Cantor Colburn LLP

(57) ABSTRACT

An airfoil platform includes a platform body having an arcuate base defining a centerline axis. A rail extends radially outboard from a side of the arcuate base. A feed orifice is defined at least partially in the rail. The inner diameter edge of an axially facing opening of the feed orifice is spaced apart radially outboard of an outer diameter surface of the arcuate base. A method for manufacturing an airfoil platform includes providing an airfoil platform body and forming the feed orifice through the rail. Forming the feed orifice through the rail includes forming the feed orifice radially outboard of and spaced apart from the outer diameter surface of the arcuate base.

17 Claims, 3 Drawing Sheets

(51) Int. Cl.
  *F01D 9/04*   (2006.01)
  *F01D 9/02*   (2006.01)
(52) U.S. Cl.
  CPC ......... *F05D 2240/81* (2013.01); *Y02T 50/676* (2013.01)
(58) Field of Classification Search
  CPC .. F01D 25/08; F05D 2240/81; F05D 2240/80; F05D 2260/20; F05D 2260/201; Y02T 50/676
  USPC ............................... 415/115, 116; 416/193 A
  See application file for complete search history.

(56) References Cited

U.S. PATENT DOCUMENTS

| | | | |
|---|---|---|---|
| 7,972,107 B2* | 7/2011 | Dervaux | F01D 9/06 |
| | | | 415/115 |
| 7,976,274 B2* | 7/2011 | Lee | F01D 5/143 |
| | | | 415/190 |
| 8,246,297 B2* | 8/2012 | Jain | F01D 11/08 |
| | | | 415/116 |
| 8,777,559 B2* | 7/2014 | Koyabu | F01D 11/08 |
| | | | 415/116 |
| 2006/0127212 A1 | 6/2006 | Durocher et al. | |
| 2013/0251508 A1* | 9/2013 | Tardif | F01D 9/02 |
| | | | 415/115 |
| 2014/0047843 A1 | 2/2014 | Papple et al. | |

OTHER PUBLICATIONS

European Search Report for EP Application No. 16151762.8 dated Jun. 10, 2016.

* cited by examiner

COOLING FEED ORIFICES

BACKGROUND OF THE INVENTION

1. Field of the Invention

The present disclosure relates to cooling turbomachine components, and more particularly to cooling orifices used in cooling passages for gas turbine engines.

2. Description of Related Art

A variety of devices and methods are known in the art for cooling components in hot sections of gas turbine engines. Of such devices, many are directed to providing cooling air through cooling passages to airfoil components in the high pressure turbine. In the cooling passages, feed orifices are used to guide cooling air into the cooling passage in order to maintain component temperatures for component function and life. Cooling passages and feed orifices can be subject to high thermal stresses. It is expected that this will be exacerbated due to the ongoing trend of designing gas turbine engines to operate at even higher temperatures and pressures.

Such conventional methods and systems have generally been considered satisfactory for their intended purpose. However, there is still a need in the art for improved cooling passages and feed orifices. The present disclosure provides a solution for this need.

SUMMARY OF THE INVENTION

An airfoil platform includes a platform body having an arcuate base defining a centerline axis. A rail extends radially outboard from a side of the arcuate base. A feed orifice is defined at least partially in the rail. The inner diameter edge of an axially facing opening of the feed orifice is spaced apart radially outboard of an outer diameter surface of the arcuate base.

The distance from the inner diameter edge of the axially facing opening of the feed orifice to the outer diameter surface of the arcuate base in direction normal to the outer diameter surface can range from 0.990 to 1.21 times the breadth of the cross-section of the feed orifice. The cross-section can be taken perpendicular to a longitudinal axis of the feed orifice. The rail can be a first rail and the platform body can include a second rail extending radially outboard from a second side of the arcuate base, e.g. opposite the first rail. The first and second rails can be axially spaced apart from one another. A platform cooling passage can be defined in the first rail. The feed orifice can be in fluid communication with the platform cooling passage.

A longitudinal axis of the feed orifice can be obliquely angled radially outboard with respect to the centerline axis. The cross-section of the feed orifice can have a circumferential width, and a breadth in a direction perpendicular to the width. The breadth can range from 0.120 inches (3.05 mm) to 0.130 inches (3.30 mm). The circumferential width can range from 2.02 to 2.10 times the breadth. The cross-section can have a generally rectangular shape with corner radii. Each corner radius can have a radius ranging from 0.240 to 0.320 times the breadth. The cross-section can have an area ranging from 0.0290 in$^2$ (18.7 mm$^2$) to 0.0334 in$^2$ (21.5 mm$^2$).

In accordance with certain embodiments, an airfoil stage for a gas turbine engine includes an inner diameter platform defining an engine centerline axis and an outer diameter platform radially outboard from the inner diameter platform. The outer diameter platform includes an airfoil platform body as described above. The airfoil stage includes an airfoil extending radially between the inner and outer diameter platforms. The feed orifice can be in fluid communication with the platform cooling passage to provide cooling air to the platform cooling passage to maintain target component material temperatures.

A method for manufacturing an airfoil platform includes providing an airfoil platform body, as described above. The method includes forming the feed orifice through the rail. Forming the feed orifice through the rail includes forming the feed orifice radially outboard of and spaced apart from the outer diameter surface of the arcuate base. Forming the feed orifice through the rail can include tilting a machining tool with respect to the centerline axis to form the feed orifice in an oblique radially outboard direction.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
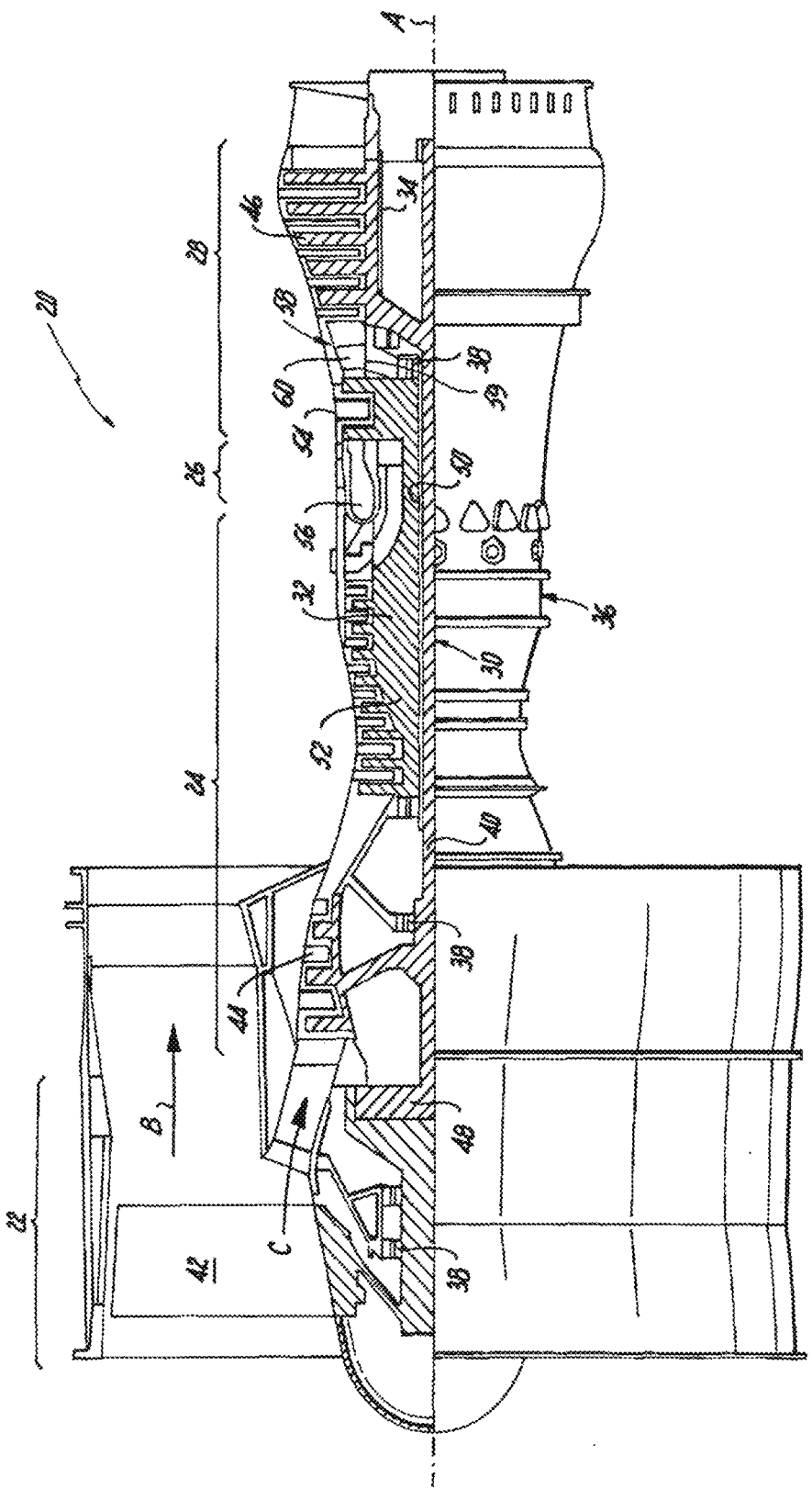
FIG. 1 is a schematic cross-sectional side elevation view of an exemplary embodiment of a gas turbine engine constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of a platform constructed in accordance with the disclosure is shown in FIG. 3 and is designated generally by reference character 100. Other embodiments of platforms in accordance with this disclosure, or aspects thereof, are provided in FIGS. 1-2 and 4-5, as will be described.

As shown in FIG. 1, a gas turbine engine 20 is schematically shown. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. Mid-turbine frame 58 includes an inner case 59 and supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

Figure 2:
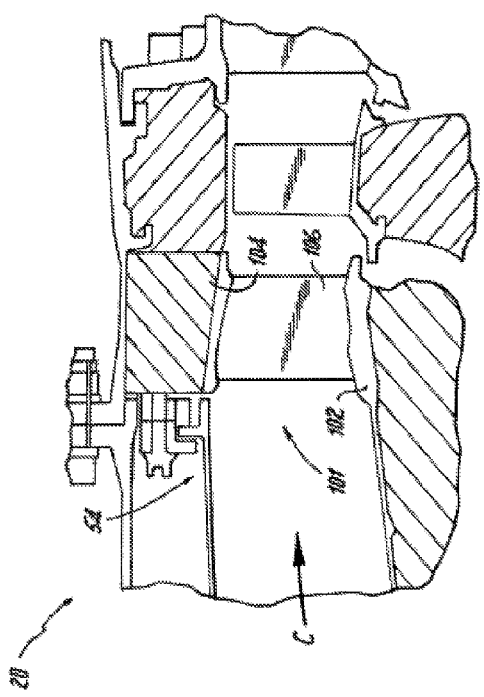
FIG. 2 is a schematic cross-sectional side elevation view of a portion of the gas turbine engine of FIG. 1, showing a first vane stage in the high pressure turbine.
Figure 3:
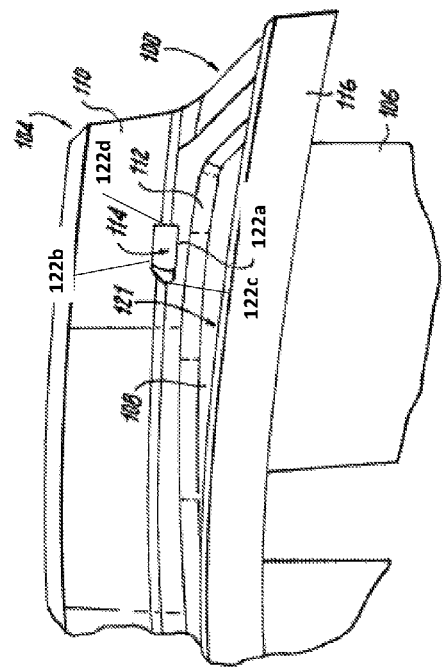
FIG. 3 is a perspective view of a portion of the first vane stage of FIG. 2, as viewed from an upstream side of the gas turbine engine, showing an outer diameter platform having a feed orifice.

Now with reference to FIG. 2, a portion of gas turbine engine 20 is shown. Gas turbine engine 20 has a vane stage 101, for example the first vane stage in the high pressure turbine (HPT) 54, that includes an inner diameter platform 102 oriented about centerline axis A, e.g. engine central longitudinal axis A, as shown in FIG. 1, and an outer diameter platform 104 radially outboard from inner diameter platform 102. Vane stage 101 includes a vane 106 extending radially between the inner and outer diameter platforms 102 and 104, respectively. Those skilled in the art will readily appreciate that while the airfoil stage shown and described throughout the specification is a vane stage, a variety of airfoil stages can be used, for example a blade stage or a variable vane stage.

As shown in FIG. 3, outer diameter platform 104 includes a platform body 100. Platform body 100 has an arcuate base 108 oriented about centerline axis A, shown in FIG. 1. A first rail 110 extends radially outboard from a first side 112 of arcuate base 108. Platform body 100 includes a second rail 116 extending radially outboard from a second side 118 of arcuate base 108. First and second rails 110 and 116, respectively, are axially spaced apart from one another.

Figure 4:
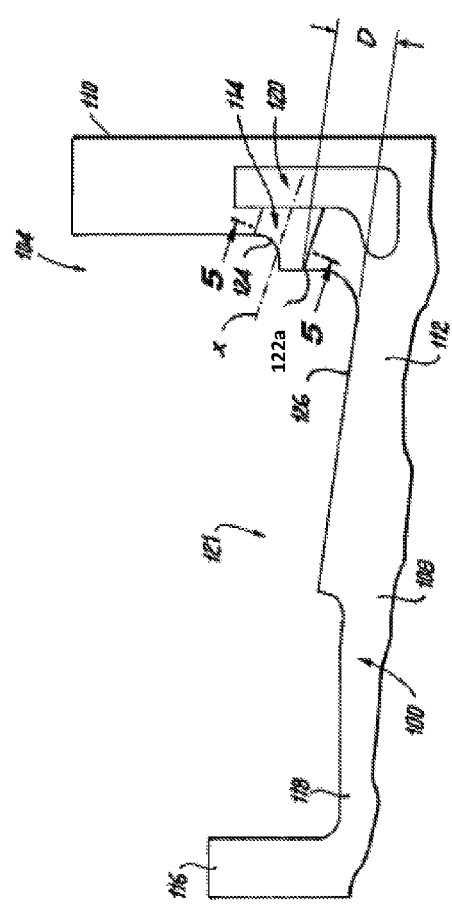
FIG. 4 is a schematic cross-sectional side elevation view of the outer diameter platform and feed orifice of FIG. 3, showing an axial facing opening of the feed orifice.

With reference now to FIGS. 2-4, a feed orifice 114 is defined in first rail 110. The inner diameter edge 122a of the axially facing opening 124 of feed orifice 114 is spaced apart radially outboard of an outer diameter surface 126 of arcuate base 108 in order to reduce thermal stresses acting on feed orifice 114. The axially facing opening 124 of the feed orifice 114 has the inner diameter edge 122a, an outer diameter edge 122b, a first edge 122c and a second edge 122d extending between the inner diameter edge 122a and the outer diameter edge 122b. The first edge 122c is disposed opposite and is disposed in a non-parallel relationship with the second edge 122d. The first edge 122c becomes progressively farther away from the second edge 122d in a direction that extends from the outer diameter edge 122b towards the inner diameter edge 122a. A platform cooling passage 120 is defined within first rail 110 in a circumferential direction. Feed orifice 114 is in fluid communication with platform cooling passage 120 to provide cooling air to platform cooling passage 120 to maintain target component, e.g. vane 106, material temperatures. Feed orifice 114 fluidly connects cooling passage 120 to a flow cavity 121. Flow cavity 121 is defined between outer diameter surface 126 of arcuate base 108, first rail 110 and second rail 116. While platform body 100 and feed orifice 114 have been described herein as being part of the first vane stage of the HPT 54, those skilled in the art will readily appreciate that platform body 100 and feed orifice 114 can be in a variety of vane stages throughout gas turbine engine 20. Additionally, it is contemplated that similar platforms can be used for other airfoils, e.g., blades.

Figure 5:
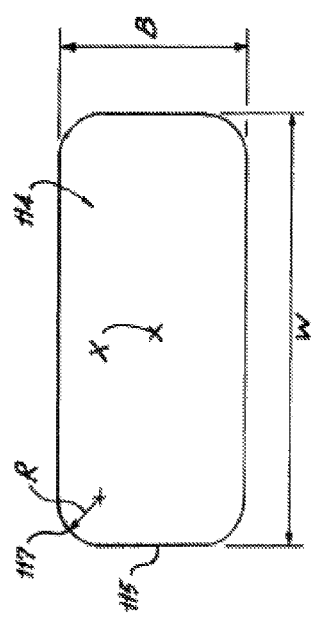
FIG. 5 is a schematic outline of the cross-sectional area of the feed orifice of FIG. 4, showing the width and breadth of the orifice.

As shown in FIGS. 4 and 5, the distance D from inner diameter edge 122a of the axially facing opening 124 of feed orifice 114 to outer diameter surface 126 in a direction normal to outer diameter surface 126, ranges from 0.880 to 1.32 times a breadth B of a cross-section of feed orifice 114. The cross-section is taken perpendicular to a longitudinal axis X of feed orifice 114. For example, distance D can range from 0.990 to 1.21 times breadth B, such as 1.1 times breadth B.

With continued reference to FIGS. 4 and 5, longitudinal axis X of feed orifice 114 is obliquely angled radially outboard with respect to the centerline axis A. Cross-section 115 of feed orifice 114 has a circumferential width W ranging from 1.65 to 2.48 times breadth B. For example, width W can range from 1.86 to 2.27 times breadth B, or more particularly 2.02 to 2.10 times breadth B, such as 2.064 times breadth B. Breadth B ranges from 0.100 inches (2.54 mm) to 0.150 inches (3.81 mm). For example, breadth B can range from 0.113 inches (2.87 mm) to 0.138 inches (3.51 mm), or more particularly from 0.120 inches (3.05 mm) to 0.130 inches (3.30 mm), such as 0.125 inches (3.18 mm). Breadth B is taken in a direction perpendicular to width W. Cross-section 115 has a generally rectangular shape with corner radii 117. Each corner radius 117 has a radius R ranging from 0.224 to 0.336 times breadth B. For example, radius R can range from 0.240 to 0.320 times breadth B, more particularly 0.252 to 0.308 times breadth B, such as 0.280 times breadth B. Cross-section 115 has an area ranging from 0.0250 in$^2$ (16.1 mm$^2$) to 0.0374 in$^2$ (24.1 mm$^2$). For example cross-section 115 can range from 0.0280 in$^2$ (18.1 mm$^2$) to 0.0343 in$^2$ (22.1 mm$^2$), or more particularly from 0.0290 in$^2$ (18.7 mm$^2$) to 0.0334 in$^2$ (21.5 mm$^2$), such as 0.0312 in$^2$ (20.1 mm$^2$). Those skilled in the art will readily appreciate that the cross-sectional dimensions of feed orifice 114 ensure the correct level of cooling flow is supplied into cooling passage 120 and meet durability requirements. Additionally, the size and orientation of feed orifice 114 reduce pressure losses and reduce backflow as compared with traditional feed orifices.

A method for manufacturing a vane platform, e.g. outer diameter vane platform 104, includes providing a vane platform body, e.g. platform body 100. The method includes forming a feed orifice, e.g. feed orifice 114, through a rail, e.g. first rail 110. Forming the feed orifice through the rail includes forming the feed orifice radially outboard of and spaced apart from an outer diameter surface, e.g. outer diameter surface 126, of an arcuate base, e.g. arcuate base 108. Forming the feed orifice through the rail includes tilting a machining tool with respect to the centerline axis, e.g. centerline axis A, to form the feed orifice in an oblique radially outboard direction.

The methods and systems of the present disclosure, as described above and shown in the drawings, provide for platforms and feed orifices with superior properties including reduced thermal stresses. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An airfoil platform comprising:
a platform body having:
   an arcuate base defining a centerline axis;
   a first rail extending radially outboard from a first side of the arcuate base;
   a platform cooling passage that is defined within the first rail and at least partially extends into the arcuate base towards a second side of the arcuate base; and
   a feed orifice defined at least partially in the first rail, is in fluid communication with the platform cooling passage, and is spaced apart radially outboard of an outer diameter surface of the arcuate base, the feed orifice includes an axially facing opening having an inner diameter edge, an outer diameter edge, a first edge and a second edge extending between the inner diameter edge and the outer diameter edge, the first edge disposed opposite and disposed in a non-parallel relationship with the second edge.

2. The airfoil platform as recited in claim 1, wherein a distance from the inner diameter edge of the axially facing opening of the feed orifice to the outer diameter surface of the arcuate base in a direction normal to the outer diameter surface ranges from 0.990 to 1.21 times a breadth of a cross-section of the feed orifice, wherein the cross-section is taken perpendicular to a longitudinal axis of the feed orifice.

3. The airfoil platform as recited in claim 1, wherein the platform body includes a second rail extending radially outboard from the second side of the arcuate base, wherein the first and second rails are axially spaced apart from one another.

4. The airfoil platform as recited in claim 1, wherein a longitudinal axis of the feed orifice is obliquely angled radially outboard with respect to the centerline axis.

5. The airfoil platform as recited in claim 1, wherein a cross-section taken perpendicular to a longitudinal axis of the feed orifice has a circumferential width, and a breadth in a direction perpendicular to the width, wherein the breadth ranges from 0.120 inches (3.05 mm) to 0.130 inches (3.30 mm).

6. The airfoil platform as recited in claim 1, wherein a cross-section taken perpendicular to a longitudinal axis of the feed orifice has a circumferential width ranging from 2.02 to 2.10 times a breadth, wherein the breadth is taken in a direction perpendicular to the width.

7. The airfoil platform as recited in claim 1, wherein a cross-section taken perpendicular to a longitudinal axis of the feed orifice has a circumferential width, and a breadth in a direction perpendicular to the width, and has a generally rectangular shape with corner radii, each corner having a radius ranging from 0.240 to 0.320 times the breadth.

8. The airfoil platform as recited in claim 1, wherein a cross-section taken perpendicular to a longitudinal axis of the feed orifice has an area ranging from 0.0290 in.sup.2 (18.7 mm.sup.2) to 0.0334 in.sup.2 (21.5 mm.sup.2).

9. An airfoil stage for a gas turbine engine, the airfoil stage comprising:
an inner diameter platform defining an engine centerline axis;
an outer diameter platform radially outboard from the inner diameter platform, wherein the outer diameter platform includes:
   an arcuate base;
   a first rail extending radially outboard from a first side of the arcuate base;

a second rail extending radially outboard from a second side of the arcuate base that is disposed opposite the first rail;

a feed orifice and a platform cooling passage defined in the first rail, wherein a longitudinal axis of the feed orifice is angled radially outboard with respect to the engine centerline axis and wherein the feed orifice is in fluid communication with the platform cooling passage to provide cooling air to the platform cooling passage to maintain target component material temperatures and wherein an inner diameter edge of an axially facing opening of the feed orifice is spaced apart radially outboard of an outer diameter surface of the arcuate base, wherein the axially facing opening includes an inner diameter edge, an outer diameter edge, a first edge and a second edge extending between the inner diameter edge and the outer diameter edge, the first edge disposed opposite and disposed in a non-parallel relationship with the second edge; and an airfoil extending radially between the inner and outer diameter platforms.

10. The airfoil stage as recited in claim 9, wherein a distance from the inner diameter edge of the axially facing opening of the feed orifice to the first outer diameter surface of the arcuate base in a direction normal to the first outer diameter surface ranges from 0.990 to 1.21 times a breadth of a cross-section of the feed orifice, wherein the cross-section is taken perpendicular to a longitudinal axis of the feed orifice.

11. The airfoil stage as recited in claim 9, wherein the first and second rails are axially spaced apart from one another.

12. The airfoil stage as recited in claim 9, wherein a cross-section taken perpendicular to a longitudinal axis of the feed orifice has a radial breadth ranging from 0.120 inches (3.05 mm) to 0.130 inches (3.30 mm).

13. The airfoil stage as recited in claim 9, wherein a cross-section taken perpendicular to a longitudinal axis of the feed orifice has a circumferential width ranging from 2.02 to 2.10 times a breadth, wherein the breadth is taken in a direction perpendicular to the width.

14. The airfoil stage as recited in claim 9, wherein a cross-section taken perpendicular to a longitudinal axis of the feed orifice has a circumferential width, and a breadth in a direction perpendicular to the width, and has a generally rectangular shape with corner radii, each corner having a radius ranging from 0.240 to 0.320 times the breadth.

15. The airfoil stage as recited in claim 9, wherein a cross-section taken perpendicular to a longitudinal axis of the feed orifice has an area ranging from 0.0290 in.$^2$ (18.7 mm.$^2$) to 0.0334 in.$^2$ (21.5 mm.$^2$).

16. A method for manufacturing an airfoil platform, the method comprising:

providing an airfoil platform body, wherein the airfoil platform body includes:

an arcuate base defining a centerline axis;

a rail extending radially outboard from a side of the arcuate base; and a feed orifice defined in the rail, the feed orifice includes an axially facing opening having an inner diameter edge, an outer diameter edge, a first edge and a second edge extending between the inner diameter edge and the outer diameter edge, the first edge disposed opposite and disposed in a non-parallel relationship with the second edge;

defining a platform cooling passage in the rail and at least partially in the base, the platform cooling passage extending towards a second rail that is spaced apart from the rail; and forming a feed orifice within the rail that is in fluid communication with the platform cooling passage, wherein forming the feed orifice through the rail includes forming the feed orifice radially outboard of and spaced apart from an outer diameter surface of the arcuate base.

17. The method as recited in claim 16, wherein forming the feed orifice through the rail includes tilting a machining tool with respect to the centerline axis to form the feed orifice in an oblique radially outboard direction.

\* \* \* \* \*